(12) United States Patent
Stripe

(10) Patent No.: US 6,852,188 B2
(45) Date of Patent: Feb. 8, 2005

(54) METHOD FOR MANUFACTURING THERMOPLASTIC TUBING

(75) Inventor: Stanley E. Stripe, Hilliard, OH (US)

(73) Assignee: Dayco Products, LLC, Miamisburg, OH (US)

(*) Notice: Subject to any disclaimer, the term of this patent is extended or adjusted under 35 U.S.C. 154(b) by 27 days.

(21) Appl. No.: 09/953,709

(22) Filed: Sep. 17, 2001

(65) Prior Publication Data

US 2002/0043330 A1 Apr. 18, 2002

Related U.S. Application Data

(63) Continuation-in-part of application No. 09/575,946, filed on May 23, 2000, now Pat. No. 6,293,312.

(51) Int. Cl.[7] .............................................. B29C 47/04
(52) U.S. Cl. .................. 156/244.13; 138/137; 138/141; 428/36.91
(58) Field of Search .................... 156/244.13, 309.3; 138/141, 137; 428/35.7, 36.91, 421

(56) References Cited

U.S. PATENT DOCUMENTS

| | | | |
|---|---|---|---|
| 3,166,688 A | 1/1965 | Rowland et al. | |
| 3,473,087 A | 10/1969 | Slade | |
| 3,561,493 A | 2/1971 | Maillard et al. | |
| 4,643,927 A | 2/1987 | Luecke et al. | |
| 4,887,647 A | 12/1989 | Igarashi et al. | |
| 5,038,833 A | 8/1991 | Brunnhofer | |
| 5,076,329 A | 12/1991 | Brunnhofer | |
| 5,170,011 A | 12/1992 | Martucci | |
| 5,383,087 A | 1/1995 | Noone et al. | |
| 5,419,374 A | 5/1995 | Nawrot et al. | |
| 5,552,199 A | * 9/1996 | Blong et al. | ............... 428/36.9 |
| 5,588,469 A | 12/1996 | Kakiuchi et al. | |
| 5,639,528 A | 6/1997 | Feit et al. | |
| 5,679,425 A | 10/1997 | Plumley | |
| 5,985,954 A | 11/1999 | Tsuchida et al. | |
| 6,005,030 A | 12/1999 | Togawa et al. | |
| 6,080,487 A | 6/2000 | Coggio et al. | |
| 6,106,914 A | 8/2000 | Kanbe et al. | |
| 6,156,400 A | 12/2000 | Jing et al. | |
| 6,230,749 B1 | * 5/2001 | Kertesz | ....................... 138/137 |
| 6,270,901 B1 | * 8/2001 | Parsonage et al. | .......... 428/421 |
| 6,346,328 B1 | * 2/2002 | Parsonage et al. | .......... 428/412 |

FOREIGN PATENT DOCUMENTS

| | | |
|---|---|---|
| EP | 0661094 A3 | 7/1995 |
| EP | 0661094 B1 | 7/1995 |
| EP | 0661094 A2 | 7/1995 |
| WO | WO95/23036 | 8/1995 |

* cited by examiner

*Primary Examiner*—Jeff H. Aftergut
*Assistant Examiner*—Jessica Rossi
(74) *Attorney, Agent, or Firm*—Joseph V. Tassone

(57) ABSTRACT

A thermoplastic tube for transfer of hydrocarbon fuel comprising an inner fluoroplastic layer and an outer polyamide layer bonded to the fluoroplastic layer wherein an adhesion promoter is included in at least one of the layers is disclosed. The adhesion promoter is an unsubstituted or substituted phenol salt of 1,8-diazabicyclo-[5,4,0]undec-7-ene on a novolac carrier which functions to increase the adhesive bond strength between the two layers. The adhesion promoter provides a chemically bonded adhesion in addition to the mechanical adhesion associated with extrusion or lamination of the layers.

21 Claims, 2 Drawing Sheets

METHOD FOR MANUFACTURING THERMOPLASTIC TUBING

CROSS REFERENCE TO RELATED APPLICATIONS:

This application is a continuation-in-part of U.S. Ser. No. 09/575,946, filed May 23, 2000 Now U.S. Pat No. 6,293,312.

BACKGROUND OF THE INVENTION

The present invention relates generally to tubing and particularly to fuel transport tubing such as fuel filler and fuel filler neck tubing. More particularly, this invention relates to a thermoplastic tubing for transfer of hydrocarbon fuel comprising a fluoropolymer inner layer and a melt processible polyamide outer layer wherein at least one of the layers also includes an adhesion promoter which improves interlayer bonding.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, temperatures often rise to extremely high levels, and in cold climates, there is exposure to extremely low temperatures as well.

This abundance of considerations has led to design of tubing having multiple layers. The materials of each layer have specific, and preferably complementary, properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses tubing having two coextruded layers of different plastics, and a coextruded layer of adhesive therebetween. The layers are chosen from plastics having complementary properties. U.S. Pat. No. 4,643,927 barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows multi-layer tubing having an inner fluororubber layer that prevents degradation due to amine-type additives and also exhibits improved adhesion to an outside rubber layer. U.S. Pat. No. 5,038,833 to Brunnhofer discloses tubing having a protective outer polyamide layer, a middle alcohol barrier layer of polyvinyl-alcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity Accumulated, non-dissipated electric charge can eventually cause a breach in a fuel line. U.S. Pat. No. 3,166,688 to Rowand et al. and U.S. Pat. No. 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuel. Hence, recent multi-layer tubing assemblies have usually included at least one permeation-resistant fluoropolymer layer. Difficulties have been encountered, however, in finding a commercially viable design. Most fluoropolymers having strong mechanical properties, for example, do not bond well with other fluoropolymers. Conversely, fluoropolymers exhibiting good bondability (polyvinylidene fluoride (PVDF), in particular) tend to be mechanically weak.

U.S. Pat. No. 5,383,087 to Noone et al. discloses an outer impact-resistant polyamide layer, an intermediate bonding layer, an inner permeation-resistant fluoroplastic layer, and an innermost conductive fluoroplastic layer for dissipation of electrostatic charge. All layers are coextruded. The innermost conductive layer exhibits an exceptional electrostatic dissipation capacity in the range of 10–4 to 10–9 ohm/cm2. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE, surface using methods such as chemical etching, plasma discharge or corona discharge. European Patent Application publication no.0551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermo-setting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can result in poor or variable degrees of adhesion. Furthermore, in many cases (such as with corona treatment), only temporary bonding is achieved and delamination may occur with aging.

Accordingly, there is a need for an improved tubing for transfer of hydrocarbon fuels that provides the necessary durability and resistance to permeation through the utilization of a dual or multi-layer structure characterized by increased adhesive bond strength between the layers.

SUMMARY OF THE INVENTION

The present invention is a multi-layer thermoplastic tube for transfer of hydrocarbon fuel comprising an inner fluoroplastic layer and an outer polyamide layer bonded to the fluoroplastic layer wherein an adhesion promoter is included in at least one of the layers. The adhesion promoter is an unsubstituted or substituted phenol salt of 1,8-diazabicyclo-

[5,4,0]undec-7-ene which functions to increase the adhesive bond strength between the two layers. The adhesion promoter provides a chemically bonded adhesion in addition to the mechanical adhesion associated with extrusion or lamination of the layers. The adhesion promoter increases the adhesion without adversely affecting the electrostatic dissipation properties of the tubing materials.

In a first embodiment of the invention, a thermoplastic multi-layer material comprising an inner layer of a thermoplastic form of a tetrafluoroethylene-hexafluoropropylene-vinylidene fluoride (THV) terpolymers and an outer layer of a melt processable polyamide bonded to said inner layer wherein at least one of the layers further comprises an adhesion promoter is provided. The adhesion promoter is an unsubstituted or substituted phenol salt of 1,8-diazabicyclo-[5,4,0]undec-7-ene (DBU). The multi-layer material is characterized by increased adhesive bonding between the layers as compared to a multi-layer material prepared without the adhesion promoter.

In a second embodiment of the invention, a tubing for transfer of hydrocarbon fuel having improved inter-layer bonding is provided. The tubing comprises an inner layer of a thermoplastic form of a tetrafluoroethylene-hexafluoropropylene-vinylidene fluoride terpolymer and an outer layer of a melt processable polyamide bonded to the inner layer wherein at least one of the layers further comprises an adhesion promoter comprising an unsubstituted or substituted phenol salt of 1,8-diazabicyclo-[5,4,0]undec-7-ene. The tubing not only exhibits improved resistance to delamination during forming and flexing, but also provides the necessary levels of impermeability to fuel vapors and is relatively inexpensive to produce.

In a first manifestation of the tubing of the present invention, the tubing structure comprises an inner barrier layer comprising a thermoplastic form of THV and an outer protective cover adjacent to and surrounding the barrier layer comprising a melt processable polyamide and an adhesion promoter comprising an unsubstituted or substituted phenol salt of 1,8-diazabicyclo-[5,4,0]undec-7-ene.

In a second manifestation of the tubing of the present invention, the tubing structure comprises an inner barrier layer comprising a thermoplastic form of THV and an adhesion promoter comprising an unsubstituted or substituted phenol salt of 1,8-diazabicyclo-[5,4,0]undec-7-ene on a novolac carrier and an outer protective cover adjacent to and surrounding the barrier layer comprising a melt processible polyamide.

In a third manifestation of the invention, the tubing structure comprises an inner barrier layer comprising a thermoplastic form of THV and an adhesion promoter comprising an unsubstituted or substituted phenol salt of 1,8-diazabicyclo-[5,4,0]undec-7-ene and an outer protective cover adjacent to and surrounding the barrier layer comprising a melt processable polyamide and an adhesion promoter comprising an unsubstituted or substituted phenol salt of 1,8-diazabicyclo-[5,4,0]undec-7-ene.

The present invention also provides a method for improving the bond strength between a fluoroplastic material and a melt processable polyamide material comprising the steps of: providing a fluoroplastic material comprising a thermoplastic form of a tetrafluoroethylene-hexafluoropropylene-vinylidene fluoride terpolymers; providing a melt processible polyamide; mixing an adhesion promoter comprising an unsubstituted or substituted phenol salt of 1,8-diazabicyclo-[5,4,0]undec-7-ene with at least one of the fluoroplastic material or the melt processable polyamide material; and forming a multi-layer article comprising a layer made of the fluoroplastic material contacting a layer made of the melt processible polyamide material. The adhesion promoter is present in an amount sufficient to increase the adhesive bond strength between the two layers.

The present invention further provides an improved method for manufacturing tubes useful for transporting fuels the improvement which comprises the steps of: incorporating an adhesion promoter comprising an unsubstituted or substituted phenol salt of 1,8-diazabicyclo-[5,4,0]undec-7-ene on a novolac carrier into at least one melt-processible polyamide outer layer or into a tetrafluoroethylene-hexafluoropropylene-vinylidene fluoride inner layer; and forming a multi-layer tubular member comprising the thermoplastic form of a tetrafluoroethylene-hexafluoropropylene-vinylidene fluoride inner layer and said melt processible polyamide outer layer in the absence of a separate intermediate tie layer between said thermoplastic form of a tetrafluoroethylene-hexafluoropropylene-vinylidene fluoride and said melt processible polyamide.

The methods and compositions of this invention are particularly useful for making multi-layer articles such as tubing and hoses suitable for conveying hydrocarbon fuels. The tubing, when employed in fuel transport hoses, provides increased inter-layer bonding and low permeability to hydrocarbon fuel vapors.

DETAILED DESCRIPTION

Figure 1:
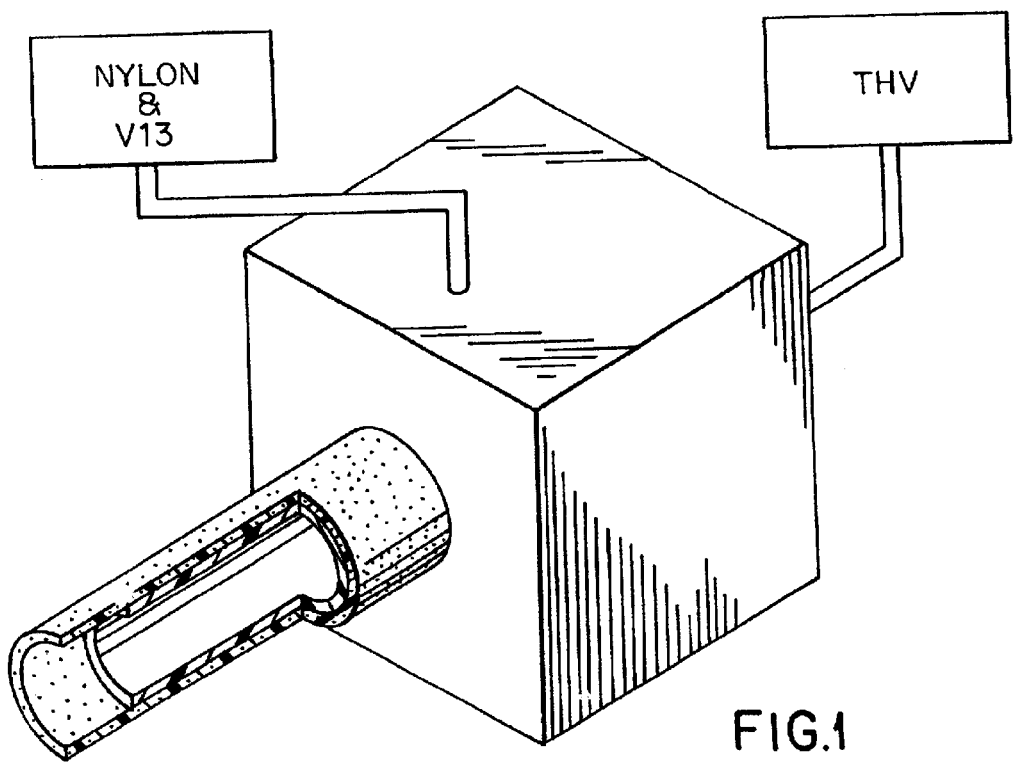
FIG. 1 is a schematic representation illustrating a method for producing a tubing according to one embodiment of the present invention.

The present invention is a thermoplastic tube 10 suitable for transfer of hydrocarbon fuel. The thermoplastic tube 10 of the invention includes an inner fluoroplastic layer 12 and an outer polyamide layer 14 bonded to the fluoroplastic layer 12. At least one of the layers 12, 14 also includes an adhesion promoter 16 which functions to increase the adhesive bond strength between the two layers. The adhesion promoter 16 is an unsubstituted or substituted phenol salt of 1,8-diazabicyclo-[5,4,0]undec-7-ene. The adhesion promoter provides a chemically bonded adhesion in addition to the mechanical adhesion associated with extrusion or lamination of the layers.

The drawings and the following detailed description are directed primarily to a two layer tubing corresponding to a preferred embodiment of the present, invention. However, it is not beyond the scope of the invention to include one or more additional layers to produce a multi-layer article or tubing having three or more layers. FIG. 1 is a schematic representation illustrating the general scheme for producing a thermoplastic multi-layer article or tubing 10 in accordance with the present invention. FIG. 1 illustrates an embodiment of the present invention wherein starting materials including a fluoroplastic material containing an adhesion promoter and a melt processible polyamide material are used to form a multi-layer article or tubing 10. Various methods known in the art can be used to produce a bonded multi-layer article or tubing 10 wherein the inner fluoroplastic layer 12 is bonded to the outer polyamide layer 14. For instance, it is believed that the fluoroplastic and polyamide can be formed by known methods into thin film layers. The fluoroplastic layer 12 and the polyamide layer 14 can then be laminated together under heat and/or pressure to form a bonded, multi-layer article 10. Alternatively, the fluoroplastic layer 12 and the polyamide layer 14 are co-extruded into a multi-layer article or tubing 10.

Figure 2:
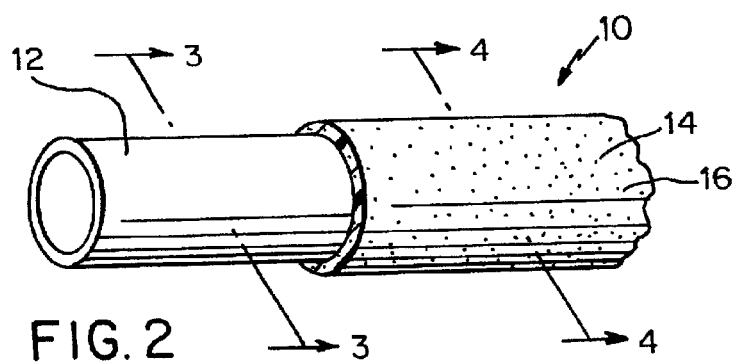
FIG. 2 is a perspective cutaway view of a tubular member illustrating a first manifestation of the present invention.
Figure 3:
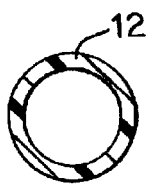
FIG. 3 is a cross-sectional view along line 3—3 in FIG. 2.
Figure 4:
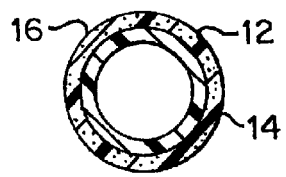
FIG. 4 is a cross-sectional view along line 4—4 in FIG. 2.

FIGS. 2, 3 and 4 illustrate a preferred manifestation of the present invention wherein a tubing 10 comprises an inner barrier layer 12 forming the interior wall of the tubing 10 and an outer cover 14 as the exterior protective surface of the tubing 10. The inner layer comprises a thermoplastic form of a THV terpolymers. The outer cover 14 comprises a melt processible polyamide and an adhesion promoter 16.

Figure 5:
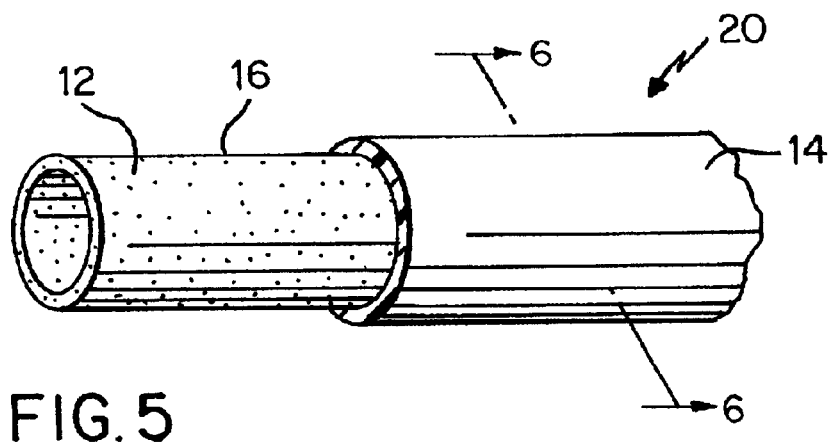
FIG. 5 is a perspective cutaway view of a tubular member which illustrates another manifestation of the present invention.
Figure 6:
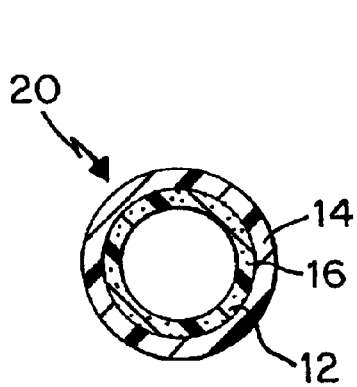
FIG. 6 is a cross-sectional view along line 6—6 in FIG. 5.

FIGS. 5 and 6 illustrate a second manifestation wherein a tube 20 comprises an inner barrier layer 12 forming the interior wall of the tube 20 and an outer cover 14 as the exterior protective surface of the tube 20. The inner layer comprises a thermoplastic form of a THV terpolymers and an adhesion promoter 16. The outer cover 14 comprises a melt processible polyamide.

Figure 7:
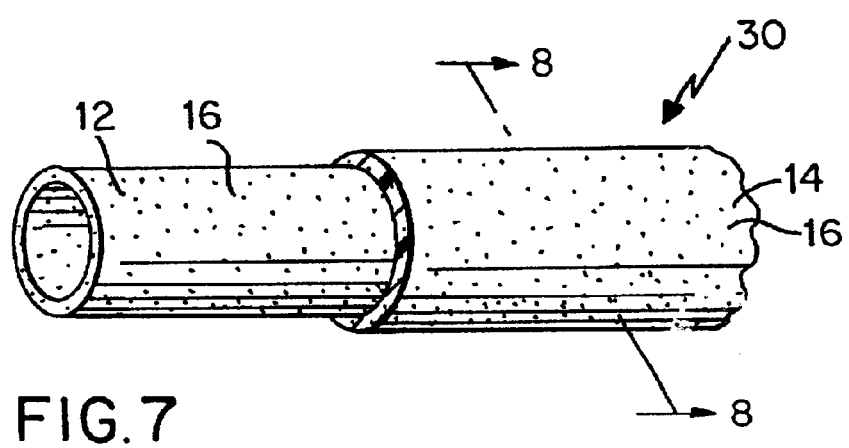
FIG. 7 is a perspective cutaway view of a tubular member which illustrates another manifestation of the present invention.
Figure 8:
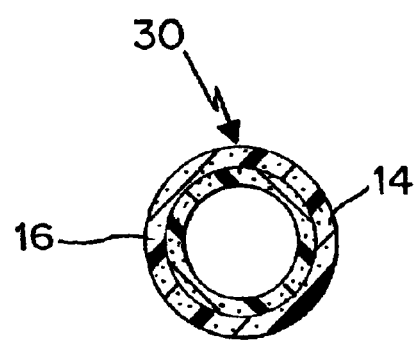
FIG. 8 is a cross-sectional view along line 8—8 in FIG. 7.

A third manifestation of the invention is illustrated in FIGS. 7 and 8 where the tube 30 comprises an inner barrier layer 12 forming the interior wall of the tube 30 and an outer cover 14 forming the exterior protective surface of the tube 30. The inner layer 12 comprises a thermoplastic form of a THV terpolymers and an adhesion promoter 16. The outer cover 14 comprises a melt processible polyamide and an adhesion promoter 16.

The term "hydrocarbon" as used herein is meant to include fuels such as gasoline, oils, air conditioning gases, organic chemicals, and the like.

The inner barrier layer 12 of the invention is formed from a fluoroplastic terpolymers comprised of the monomers tetrafluoroethylene, hexafluoropropylene and vinylidene fluoride. The tetrafluoroethylene-hexafluoropropylene-vinylidene fluoride fluorooplastic terpolymers is a fluorothermoplastic such as Dyneon THV, which is commercially available from Dyneon. The terpolymer useful in the present invention exhibits improved gasoline permeation resistance. Typically, the thickness of the barrier is about 5 to 25 mils, preferably about 14 to 14 mils.

The outer cover 14 of the tubing is a protective layer of a melt processible polyamide having good heat resistance, oil resistance, weather resistance and flame resistance. Polyamides useful as the protective outer layer are generally commercially available. For example, polyamides such as any of the well known nylons are available from a number of sources. Particularly preferred polyamides are nylon 6, nylon 6—6, nylon 11 or nylon 12. It should be noted that the selection of a particular polyamide material should be based upon the physical requirements of the particular application for the resulting article. For example, nylon 6 and nylon 6—6 offer higher heat resistant properties than nylon 11 or nylon 12, whereas nylon 11 and nylon 12 offer better chemical resistance properties. In addition to those polyamide materials, other nylon materials such as nylon 6,12; nylon 6,9; nylon 4; nylon 4,6; nylon 7 and nylon 8 may also be used. Ring-containing polyamides, e.g., nylon 6,T and nylon 6,I may also be used. Polyether- containing polyamides, such as Pebax™. Polyamides may also be used.

The adhesion promoter 16 of the present invention improves inter-layer adhesion between the inner barrier layer and the outer protective layer 14. The adhesion promoter 16 of the invention is an unsubstituted or substituted phenol salt of 1,8-diazabicyclo[5,4,0]undec-7-ene (DBU). The salt can be obtained by adding a compound having a phenolic hydroxyl group phenol, cresol or the like to (DBU). The preferred adhesion promoters are salts of phenol novolac resin with 1,8-diazabicyclo[5,4,0]undec-7-ene having a total amine value of approximately 102 to 118 and a softening point of about 125° C. to 146° C. The adhesion promoter 16 is uniformly dispersed within at least one of the thermoplastic THV composition or the melt-processible polyamide composition used to produce the inner barrier layer and outer protective layer, respectively. Preferably, a layer of the tubing modified with the adhesion promoter contains from about 0.1 to 3 phr of the adhesion promoter.

As is common practice in the industry, one or more layers of the tubing can be made conductive to prevent the buildup of static electricity generated by the flow of fuel along the inner surface of the hose. Such a build up of static electricity over time has been known to cause the formation of pin holes in the hose allowing the fuel to leak out through the holes. Typically, the inner barrier layer 12 or the outer layer 14 is made conductive by compounding the layer material with carbon black or other industry recognized ingredients to provide conductivity to the barrier layer. While the amount of carbon black added is not critical, excess carbon black tends to make the material more difficult to process. In vapor or vent applications, the innermost layer of the hose need not be conductive. Unlike some prior art methods for improving inter-layer bonding which can deleteriously affect the electrostatic dissipative properties of the tubing, the adhesion promoter and processing conditions of the present invention do not interfere with the electrostatic dissipative properties of the tubing.

The methods of producing the fuel transfer tubing of the present invention are known in the art. For example, thin film lamination, separate extrusion, tandem extrusion, or coextrusion processes may be used. For versatility and cost, reasons, the preferred methods for producing the hydrocarbon transfer tubing of the present invention are separate extrusion and tandem extrusion.

Production of the preferred embodiment of the present invention is as follows. First, a twin screw extruder is used to mix\disperse the adhesion promoter (Y-13) at a concentration of 0.1 to 3 phr with a melt processible polyamide selected from the group consisting of Nylon 6, Nylon 6—6, Nylon 11 and Nylon 12. The resulting composition is pelletized and used as a protective cover or veneer layer in a coextruded tube over an inner THV layer.

Alternatively, a tubing incorporating the adhesion promoter in the inner barrier layer can be produced as follows. First, the adhesion promoter is blended with the THV composition at a concentration of 0.1 to 3 phr. Then, the modified THV and a melt processible polyamide are coextruded using two extruders and a coextrusion die which extrudes both materials simultaneously to form the tubing according to another embodiment of the present invention.

One of the advantages of the thermoplastic tubing of the present invention is that the outer layer may be directly bonded to the inner barrier layer without the need for an intermediate tie layer. Presence of the adhesion promoter in one or both layers of the tubing provides improved interlayer bonding strength which produces a tube resistant to delamination during forming or use.

The tube of the invention may optionally include a reinforcing member which affords physical strength to the finished tubing. Typically, the reinforcing member is selected from a group consisting of glass fibers, cotton fibers, polyamide fibers, polyester fibers, and rayon fibers. Preferably, the reinforcing material is an aromatic polyamide such as Kevlar™ or Nomex™ both of which are manufactured by DuPont. The reinforcing material may be either knitted, braided, or spiraled to form the reinforcing member. Alternatively, the reinforcing material may be chopped and added to the nylon.

Other additives such as antioxidants, processing aids, etc. can be employed in carrying out the present invention and it is within the scope of this invention to incorporate herein any such additives as commonly used in making fuel line tubing.

The THV barrier layer of the present invention is useful in reducing the permeability of fuel vapors from the fuel transfer tube; however, it is also useful in reducing the permeability of chemical vapors such as in air conditioning hoses, oil hoses, and the like where severe chemical resistance or vapor permeation resistance is required.

Having described the invention in detail and by reference to preferred embodiments thereof, it will be apparent that modifications and variations are possible without departing from the scope of the invention defined in the appended claims.

What is claimed is:

1. In a method for the manufacture of a thermoplastic fuel transport tube using thin film lamination, separate extrusion, tandem extrusion or coextrusion processes, wherein said thermoplastic fuel transport tube includes a thermoplastic form of a melt-processible tetrafluoroethylene-hexafluoropropylene-vinylidene fluoride terpolymer inner layer and a melt-processible polyamide outer layer, the improvement which comprises bonding said polyamide outer layer directly onto said tetrafluoroethylene-hexafluoropropylene-vinylidene fluoride terpolymer inner layer without the need for an intermediate tie layer to bond said melt-processible polyamide outer layer to said tetrafluoroethylene-hexafluoropropylene vinylidene terpolymer inner layer, wherein said bonding comprises the steps of:

incorporating an adhesion promoter comprising an unsubstituted or substituted phenol salt of 1,8-diazabicyclo-[5,4,0]undec-7-ene on a novolac carrier into at least one of said polyamide outer layer and said tetrafluoroethylene-hexafluoropropylene-vinylidene fluoride terpolymer inner layer; and forming a multi-layer tubular member comprising said tetrafluoroethylene-hexafluoropropylene-vinylidene fluoride inner layer and said polyamide outer layer in the absence of a separate intermediate tie layer between said tetrafluoroethylene-hexafluoropropylene-vinylidene fluoride terpolymer inner layer and said polyamide outer layer.

2. The method of claim 1 wherein said polyamide is a nylon selected from the group consisting of nylon 6, nylon 6—6, nylon 11 and nylon 12.

3. The method of claim 1 wherein said adhesion promoter is present in said at least one of said polyamide outer layer or said tetrafluoroethylene-hexafluoropropylene-vinylidene fluoride terpolymer at a concentration of about 0.1 to 3.0 phr.

4. The method of claim 1 wherein said adhesion promoter is present in said polyamide outer layer.

5. The method of claim 1 wherein said adhesion promoter is present in said tetrafluoroethylene-hexafluoropropylene-vinylidene fluoride terpolymer inner layer.

6. The method of claim 1 wherein said adhesion promoter is present in both said polyamide outer layer and in said tetrafluoroethylene-hexafluoropropylene-vinylidene fluoride terpolymer inner layer.

7. The method of claim 1 wherein said thermoplastic tube is a two-layer tube.

8. The method of claim 1 wherein said thermoplastic tube further includes a conductive material.

9. The method of claim eight wherein said conductive material is carbon black.

10. In a method for the manufacture of a thermoplastic fuel transport tube using thin film lamination, separate extrusion, tandem extrusion or coextrusion processes, wherein said thermoplastic fuel transport tube includes a thermoplastic form of a tetrafluoroethylene-hexafluoropropylene-vinylidene fluoride terpolymer inner layer and a melt-processible nylon outer layer, the improvement which comprises bonding said nylon directly onto said tetrafluoroethylene-hexafluoropropylene-vinylidene fluoride terpolymer inner layer without the need for an intermediate tie layer to bond said nylon outer layer to said tetrafluoroethylene-hexafluoropropylene-vinylidene terpolymer inner layer, wherein said bonding comprises the steps of:

incorporating an adhesion promoter comprising an unsubstituted or substituted phenol salt of 1,8-diazabicyclo [5,4,0]undec-7-ene on a novolac carrier into said nylon outer layer; and forming a multi-layer tubular member comprising said tetrafluoroethylene-hexafluoropropylene-vinylidene fluoride terpolymer inner layer and said nylon outer layer in the absence of a separate intermediate tie layer between said tetrafluoroethylene-hexafluoropropylene-vinylidene fluoride terpolymer inner layer and said nylon outer layer, said thermoplastic tube further containing a conductive material.

11. The method of claim 10 wherein said conductive material is carbon black.

12. The method of claim 10 wherein said adhesion promoter is incorporated into said nylon outer layer at a concentration of about 0.1 to 3.0 phr.

13. The method of claim 10 wherein said nylon is nylon 12.

14. In a method for the manufacture of a thermoplastic fuel transport tube using thin film lamination, separate extrusion, tandem extrusion or coextrusion processes, wherein said thermoplastic fuel transport tube includes a thermoplastic form of a tetrafluoroethylene-hexafluoropropylene-vinylidene fluoride terpolymer inner layer and a melt-processible nylon outer layer, the improvement which comprises bonding said nylon outer layer directly onto said tetrafluoroethylene-hexafluoropropylene-vinylidene fluoride terpolymer inner layer without the need for an intermediate tie layer to bond said nylon outer layer to said tetrafluoroethylene-hexafluoropropylene-vinylidene terpolymer inner layer, wherein said bonding comprises the steps of:

incorporating an adhesion promoter comprising an unsubstituted or substituted phenol salt of 1,8-diazabicyclo-[5,4,0]undec-7-ene on a novolac carrier into said tetrafluoroethylene-hexafluoropropylene-vinylidene fluoride terpolymer inner layer; and forming a multi-layer tubular member comprising said tetrafluoroethylene-hexafluoropropylene-vinylidene fluoride terpolymer inner layer and said nylon outer layer in the absence of a separate intermediate tie layer between said tetrafluoroethylene-hexafluoropropylene-vinylidene fluoride terpolymer inner layer and said nylon outer layer, said thermoplastic tube further containing a conductive material.

15. The method of claim 14 wherein said conductive material is carbon black.

16. The method of claim 14 wherein said adhesion promoter is incorporated into said tetrafluoroethylene-hexafluoropropylene-vinylidene fluoride terpolymer inner layer at a concentration of about 0.1 to 3.0 phr.

17. The method of claim 14 wherein said nylon is nylon 12.

18. In a method for the manufacture of a thermoplastic fuel transport tube using thin film lamination, separate extrusion, tandem extrusion or coextrusion processes, wherein said thermoplastic fuel transport tube includes a thermoplastic form of a tetrafluoroethylene-hexafluoropropylene-vinylidene fluoride terpolymer inner layer and a melt-processible nylon outer layer, the improvement which comprises bonding said nylon outer layer directly onto said tetrafluoroethylene-hexafluoropropylene-vinylidene fluoride terpolymer inner layer without the need for an intermediate tie layer to bond said nylon outer layer to said tetrafluoroethylene-hexafluoropropylene-vinylidene terpolymer inner layer, wherein said bonding comprises the steps of:

incorporating an adhesion promoter comprising an unsubstituted or substantiated phenol salt of 1,8-diazabicyclo-[5,4,0]undec-7-ene on a novolac carrier into both said nylon outer layer and said tetrafluoroethylene-hexafluoropropylene-vinylidene fluoride terpolymer inner layer; and forming a multi-layer tubular member comprising said tetrafluoroethylene-hexafluoropropylene-vinylidene fluoride terpolymer inner layer and said nylon outer layer in the absence of a separate intermediate tie layer between said tetrafluoroethylene-hexafluoropropylene-vinylidene fluoride terpolymer inner layer and said nylon outer layer, said thermoplastic tube further containing a conductive material.

19. The method of claim 18 wherein said conductive material is carbon black.

20. The method of claim 18 wherein said adhesion promoter is incorporated into each of said trifluoroethylene-hexafluoropropylene-vinylidene fluoride terpolymer inner layer and said nylon at a concentration of about 0.1 to 3.0 phr.

21. The method of claim 18 wherein said nylon is nylon 12.

* * * * *